May 15, 1928.  1,669,409
G. BROWNING
SHEATH FOR CABLE CONNECTIONS TO ELECTRIC IRON PLUGS
Filed May 6, 1926
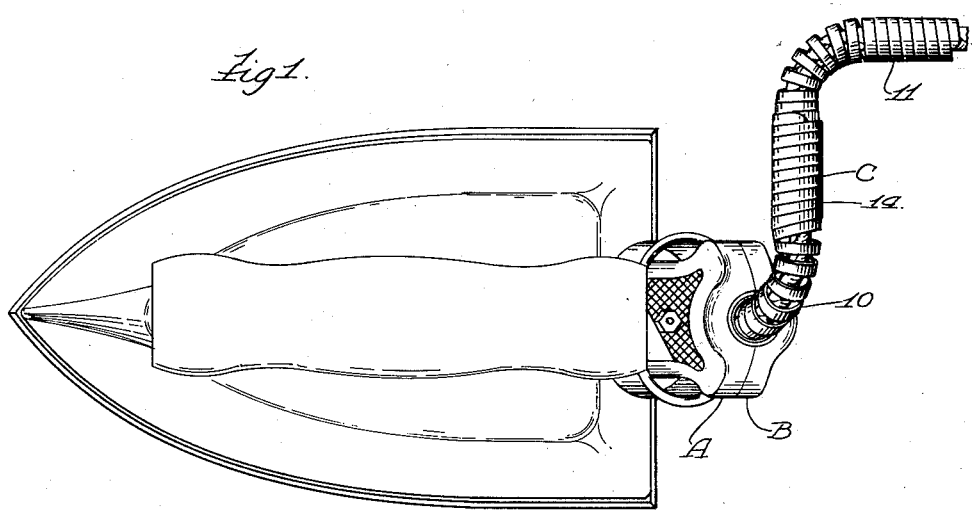
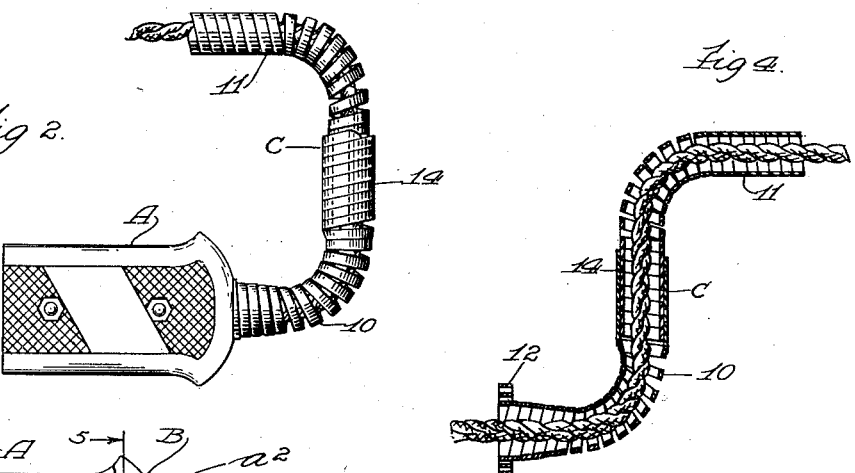
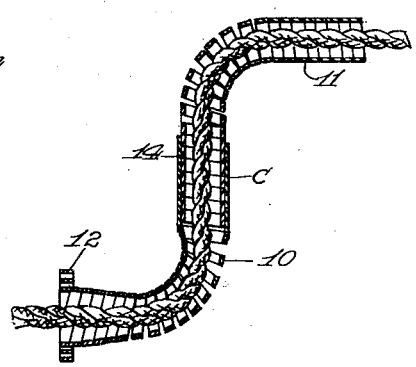
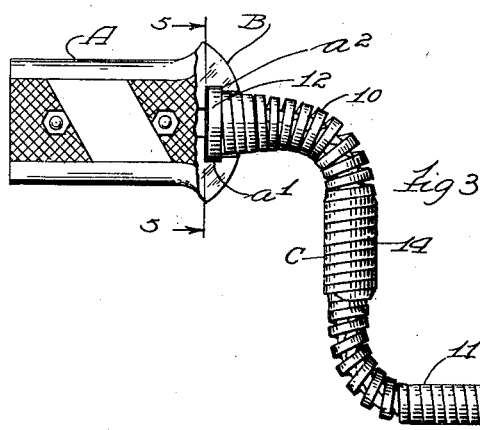
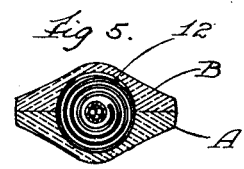
Inventor.
George Browning.
by Burton & Burton
his Attorneys.
Witness.
N. O. McKnight.

Patented May 15, 1928.

1,669,409

UNITED STATES PATENT OFFICE.

GEORGE BROWNING, OF WILMETTE, ILLINOIS, ASSIGNOR TO CHICAGO FLEXIBLE SHAFT COMPANY, OF CHICAGO, ILLINOIS, A CORPORATION OF ILLINOIS.

SHEATH FOR CABLE CONNECTIONS TO ELECTRIC-IRON PLUGS.

Application filed May 6, 1926. Serial No. 107,079.

The purpose of this invention is to provide a sheath for the inleading service connection cable of a plug for electric iron and the like which shall serve the purpose of offsetting the run of the cable from the path of movement of the iron in manual operation, for avoiding contact of the hot iron with the cable, and diminishing the liability of chafing the covering of the cable at its emergence from the sheath. It consists in the elements and features of construction shown and described as indicated in the claims.

In the drawings:—

Figure 1 is a plan view of an electric iron having the plug constructed and equipped according to this invention.

Figure 2 is a view similar to Figure 1 showing a different adjustment of the cable for changing the direction of lateral offsetting of the run of the cable from the path of the iron.

Figure 3 is a similar view showing a third adjustment with respect to the direction of run of the cable as laterally offset from the path of the iron.

Figure 4 is an axial section of the cable and sheath at the adjustment shown in Figure 1.

Figure 5 is a detail section at the line 5—5 on Figure 4.

The drawings show a familiar form of plug for electric iron, the detail construction of which does not constitute any part of this invention except as to one feature hereinafter particularized. The plug consists of two members, A and B, recessed at their abutting faces for accommodating the plug socket and the inleading cable connection. The characteristic of the invention consists in the coiled metal sheath for guarding the inleading cable. This sheath indicated in its entirety by reference letter, C, is a spiral coil having two permanent substantially 90° bends indicated at 10 and 11, said bends being at a substantial distance apart in the length of the coiled sheath. In what may be regarded as the normal or most usual adjustment shown in Figure 1, the two bends, 10 and 11, are in the same plane, the first bend, 10, being a curve from fore-and-aft direction, and the second curve being from said transverse direction to the fore-and-aft direction, thus rendering the sheath at this adjustment circumflex or nearly S-shaped in plan view. The sheath is made for swivel junction with the plug body, which is effected by coiling the terminal portion of the sheath which is to engage the plug body, helically, as seen at 12, forming a transverse flange for which a seat is formed in the two members of the plug body by recesses seen at $a^1$ which form a stop shoulder, $a^2$, engaging the helically formed flange of the coil, thereby preventing longitudinal withdrawal of the sheath from the plug body.

To facilitate adjustment of the sheath to vary the direction of lateral offsetting of the free end and of the inleading cable running therefrom with respect to the fore-and-aft path of movement of the iron in manual operation, the sheath is formed as shown in two parts which are swiveled to each other at the part of the sheath intermediate the two bends, as seen at 14. This swivel joint is satisfactorily formed by coiling one of the sheath members with sufficiently greater diameter at the portion at which the junction is to be made so that the other member may be telescoped within this slightly enlarged end portion of the first member; and for facilitating the swivel-wise telescoping engagement of the two parts the sheath is preferably made of flat tape-like metal strip or wire rather than of round wire; and the relative diameters of the two inter-telescoping members at their interlocked telescoped portions may be such that the outer member is slightly expanded and the inner member slightly contracted elastically in effecting the engagement, which causes that engagement to be reliable and secure without dependence upon other means than the frictional reaction of the interlapped parts upon each other. For facilitating the swiveling of the sheath at its engagement with the plug, the helical flange terminal, 12, is preferably coiled somewhat open, that is, with the coils slightly spaced from each other, so that the normal diameter of the flange may be such that slight radial compression shall be produced when it is engaged in the seats provided for it in the two clamped-together members of the plug body, this preventing the radial or swivel movement from being so easy as to be liable to occur when not desired, and from being too difficult to be easily caused when desired.

Beside serving the purpose of positioning the cable so as to be out of the path of movement of the iron in ironing, the doubly curved sheath described performs the additional service of diminishing and almost entirely avoiding the tendency of the cable to make an abrupt bend by sagging at its emergence from the sheath, which is observed in the customary construction of a sheath which consists of a short coil extending without permanent bend directly from the end of the plug, which sagging results after a short period of use in chafing the covering of the cable and breaking the wire at that point of emergence and abrupt bending.

I claim:—

1. A sheath for conductor cables for electric irons and the like, comprising a spiral coil, in general of tubular form, having two permanent substantially 90° bends at separated points in the length of the coil for laterally offsetting the end portions from each other, and offsetting the run of the cable laterally from the back-and-forth path of the iron in manual operation.

2. In the construction defined in claim 1, the coiled sheath consisting of two parts swiveled together intermediate the two 90° bends.

3. In the construction defined in claim 1, the sheath comprising two parts telescoped with each other intermediate the two bends.

4. In the construction defined in claim 1, the sheath coil being made of flat tape-like metal with the coils succeeding each other edge to edge.

5. In a service connection for electric irons and the like, the combination of a plug body with a sheath for conductor cables, said sheath comprising a spiral coil of tubular form having two permanent substantially 90° bends at separate points in the length of the coil for laterally offsetting the end portions from each other, and offsetting the run of the cable laterally from the back-and-forth path of the iron in manual operation, said coiled sheath being engaged with the plug body by a swivel joint, whereby the entire sheath may be rotated relatively to the plug body at said point to offset the run of the cable in any direction from the axis of the plug.

6. In a service connection for electric irons and the like, the combination of a plug body with a sheath for conductor cables, said sheath comprising a spiral coil of tubular form having two permanent substantially 90° bends at separate points in the length of the coil for laterally offsetting the end portions from each other, and offsetting the run of the cable laterally from the back-and-forth path of the iron in manual operation, said sheath having an end for junction with the plug formed in a helical coil in transverse flange-like relation to the general tubular form of the coil, and the plug body having a recess for engaging and forming the shoulder for stopping the flange-like helically-coiled terminal of the sheath for forming a swivel joint between the plug body and said sheath.

7. In a service connection for electric irons and the like, the combination of a plug body with a sheath for conductor cables, said sheath comprising a spiral coil of tubular form having two permanent substantially 90° bends at separate points in the length of the coil for laterally offsetting the end portions from each other, and offsetting the run of the cable laterally from the back-and-forth path of the iron in manual operation, said sheath having an end for junction with the plug formed in a helical coil in transverse flange-like relation to the general tubular form of the coil, and the plug body having a recess for engaging and forming the shoulder for stopping the flange-like, helically-coiled terminal of the sheath for forming a swivel joint between the plug body and said sheath, the coils of the helically-coiled terminal being spaced apart for rendering the helix elastically compressible radially, whereby the swivel engagement of the sheath with the plug body is rendered safe against longitudinal displacement while being easy of rotative adjustment for varying the direction of lateral offsetting of the run of the cable with respect to the path of the iron in manual operation.

In testimony whereof, I have hereunto set my hand at Chicago, Illinois, this 4th day of May, 1926.

GEORGE BROWNING.